United States Patent [19]

Matlack

[11] Patent Number: 4,933,402

[45] Date of Patent: Jun. 12, 1990

[54] PHOSPHORUS COMPOUNDS THAT DELAY THE METATHESIS POLYMERIZATION OF CYCLOOLEFINS

[75] Inventor: Albert S. Matlack, Hockessin, Del.

[73] Assignee: Hercules Incorporated, Wilmington, Del.

[21] Appl. No.: 292,147

[22] Filed: Dec. 30, 1988

[51] Int. Cl.$^5$ ............................ C08F 2/02; C08F 2/38; C08F 32/08

[52] U.S. Cl. .................................. 526/189; 526/139; 526/166; 526/169; 526/185; 526/190; 526/281; 526/282; 526/283; 264/328.2

[58] Field of Search ............... 526/139, 189, 281, 282, 526/283, 185, 166, 169, 190; 502/117, 121; 264/328.2

[56] References Cited

U.S. PATENT DOCUMENTS 3,790,544  2/1974  Maertens et al. ................ 269/93.1
4,080,491  3/1978  Kobayashi et al. ............... 526/137
4,727,125  2/1988  Nelson .............................. 526/141

FOREIGN PATENT DOCUMENTS 0280247  8/1988  European Pat. Off. ........... 526/283

OTHER PUBLICATIONS

Translation of Japanese Patent Laid-Open No. 61-293208, published Dec. 24, 1986.

Primary Examiner—Joseph L. Schofer
Assistant Examiner—F. M. Teskin
Attorney, Agent, or Firm—Mark Goldberg

[57] ABSTRACT

Disclosed is a method of delaying the metathesis polymerization of strained ring cycloolefins by addition of certain phosphorus-containing compounds including various aryl phosphates, aliphatic phosphates, aliphatic phosphites, aryl phosphites, aryl phosphines and alkyl phosphines.

15 Claims, No Drawings

PHOSPHORUS COMPOUNDS THAT DELAY THE METATHESIS POLYMERIZATION OF CYCLOOLEFINS

This invention relates to the polymerization of cycloolefins under the influence of aluminum alkyl and tin alkyl-activated metathesis catalyst systems. In particular, it relates to a metathesis catalyst system whose activation rate is significantly slower and more subject to control than those of presently used activator systems.

Preparation of thermoset cycloolefin polymers via metathesis catalysts is a relatively recent development in the polymer art. Klosiewicz in U.S. Pat. Nos. 4,400,340 and 4,520,181 teaches preparation of such polymers from dicyclopentadiene and other similar cycloolefins via a two-stream reaction injection molding technique wherein a first stream, including a catalyst, and a second stream, including a catalyst activator, are combined in a mix head and immediately injected into a mold where, within a matter of seconds, polymerization and molding to a permanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing until polymerization is substantially complete is still just a matter of seconds.

In the typical system, according to Klosiewicz, the catalyst component is a tungsten or molybdenum halide and the activator is an alkyl aluminum compound. The reaction rate moderator can be an ester, ether, ketone or nitrile.

Due to the extremely rapid rate of reaction of cycloolefins, even in the presence of the rate-moderated catalyst, useful polymerization has heretofore been accomplished almost exclusively by the reaction injection molding (RIM) process using the two-stream process of Klosiewicz. Even in RIM processes, the short gelation times limit the application to relatively small items and to relatively non-detailed molds with a minimum of sharp corners or "kiss-off" sections which tend to trap pockets of air if the mold is filled too rapidly or if the viscosity of the polymerization mass builds up so rapidly that the gelled monomer does not flow easily into corners or around blocked-out sections. This polymerization method cannot readily be employed in thermoset molding techniques such as pour, rotational and resin transfer molding (RTM) applications which require relatively long mold filling times. A slowing down of the polymerization is necessary for large molds. Ideally for these applications gelation is delayed with cure following rapidly.

It has been found possible (see Leach U.S. Pat. No. 4,458,037) to extend the gelation time to as much as ten minutes at room temperature by use of a dialkyl aluminum iodide activator moderated by di-n-butyl ether. When heated to 80° C., this mixture polymerizes in about 15 seconds. This system is also unsatisfactory in procedures where filling of the mold takes place slowly since the mold temperature must be held low enough during the filling operation that the reaction mixture remains fluid until the mold is entirely filled and then raised to the reaction temperature. For commercially practical production rates to be attained, the differential between mold filling temperature and polymerization reaction temperature must be smaller than is possible using the catalyst of Leach.

Several other methods have been used to increase gelation times at normal molding temperatures. Nelson in U.S. Pat. No. 4,727,125 employed nucleophilic Lewis bases selected from the class consisting of unsaturated cyclic amines and saturated polycyclic amines as reaction rate moderators. Substantial delays were found, but the level of residual monomer was unacceptably high for many applications. Bell in U.S. patent application Ser. No. 250,209 employed zinc alkyl activators instead of the aluminum alkyl compounds usually used in this type of polymerization. The problem of high residual monomer was also present in some of his results.

It is the object of this invention to provide cycloolefin polymerization feedstreams having substantially increased gelation times at normal molding temperatures compared with such mixtures heretofore known.

It is a further object of this invention to provide polymers having a low level of residual monomer.

In accordance with this invention, it has been found that the onset of gelation or viscosity build-up of metathesis polymerizable cycloolefins at temperatures up to at least about 80° C. can be significantly delayed by employing as a reaction rate moderator one or more of certain phosphorus-containing compounds. These compounds may be added to either the catalyst-containing feedstream or to the activator-containing feedstream provided that the components remain stable in the presence of these compounds.

Phosphorus compounds which can be employed in the improved process of this invention are usually included among the trialkyl phosphites, norbornene phosphites, norbornene phosphates, trialkyl phosphates, triaryl phosphates, and related compounds.

The phosphorus compounds are represented by the general formula:

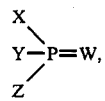

wherein X, Y and Z represent alkyl, cycloalkyl, alicyclic, aryl, aralkyl, alkaryl, alkoxy, alkylthio, aryloxy, arylthio, halogen or thiophene groups. X and Y may form a ring in which the phosphorus atom is included which is alicyclic, benzo or benzoalicyclic or X, Y and Z may form two rings which includes the phosphorus atom. W represents oxygen, sulfur or nothing. Useful compounds include trimethyl phosphite, tris(2-chloroethyl)phosphite, ethyl dichlorophosphite, triisopropylphosphite, triisobutylphosphite, diethyl chlorophosphite, triethyl phosphite, isooctyldiphenyl phosphite, triisooctyl phosphite, tris(5-norbornenyl-2-methyl)phosphate, triethyl phosphate, tributylphosphate, triphenyl phosphate, tricresylphosphate, butylated triphenyl phosphate, diethylphenyl phosphonite, diisopropyl phenylphosphonite, ethyl diphenylphosphonite, tetraethyl pyrophosphite, 1,2-phenylenephosphorochloridite, ethylene chlorophosphite, diethyl ethylenepyrophosphite, diisodecylpentaerythritol diphosphite, tripentyl phosphite, trihexylphosphite, triheptylphosphite, trineodecylphosphite, tridodecyl trithiophosphite, tributylphosphine, triphenylphosphine, and tris(5-norbornenyl-2-methyl)phosphite.

Preferred additives include tris(5-norbornenyl-2-methyl)phosphite, tris(5-norbornenyl-2-methyl)phosphate, trimethyl phosphite, trialkyl phosphites, tributyl phosphate, trialkyl phosphates, trineodecyl phosphite, diethyl phenyl phosphonite, and diisodecylpentaerythritol diphosphite. These preferred additives have been chosen as being readily available in the commercial marketplace, and as being effective in lower concentrations thus minimally effecting the properties of the polymer being produced.

The metathesis catalyst system is comprised of two parts, i.e., a catalyst component and an activator. The catalyst component is preferably either a molybdenum or a tungsten halide or such a halide having two valences satisfied by oxygen rather than halogen. The most preferred catalyst component is a tungsten halide, and preferably a mixture or complex of tungsten hexachloride ($WCl_6$) and tungsten oxytetrachloride ($WOCl_4$) in a molar ratio of $WOCl_4$ to $WCl_6$ of about 1:9 to 2:1. This mixture or complex is prepared by contacting essentially pure $WCl_6$ with a controlled portion of an oxygen donor. Useful oxygen donors include, e.g., a hydrated salt, water, a wet molecular sieve and alkyl alcohols. The most preferred oxygen donor is t-butanol. Complete details of the catalyst preparation can be found in Klosiewicz, U.S. Pat. No. 4,568,660.

The tungsten or molybdenum compound is not normally soluble in the monomer, but can be solubilized by complexing it with a phenolic compound. The compound is first suspended in a small amount of an inert diluent such as benzene, toluene, xylene or chlorinated benzene to form a 0.1 to 1 mole per liter slurry. The phenolic compound is added to the slurry in a molar ratio of about 1:1 to 1:3 catalyst compound to phenolic compound and a stream of dry inert gas is passed through the agitated solution to remove hydrogen chloride gas. Preferred phenolic compounds include phenol, alkyl phenols, halogenated phenols or phenolic salts such as lithium or sodium phenoxide. The most preferred phenolic compounds are t-butyl phenol, t-octyl phenol and nonyl phenol.

To prevent premature polymerization of the catalyst component/monomer solution, which would occur within a matter of hours, about 1 to 5 moles of a Lewis base or a chelating agent are added per mole of catalyst compound. Preferred chelants include acetylacetones, dibenzoyl methane and alkyl acetoacetates, where the alkyl group contains from 1 to 10 carbon atoms. Preferred Lewis bases are nitriles and ethers such as benzonitrile and tetrahydrofuran. The improvement in stability and shelf-life of the catalyst component/monomer solution is obtained whether the complexing agent is added before or after the phenolic compound. When this complexed catalyst component is added to purified cycloolefin, for example dicyclopentadiene, it forms a solution which is stable and has a shelf-life of several months in the absence of an activator.

The second part of the metathesis catalyst system is the activator, which is an alkyl aluminum, alkyl zinc or an alkyl tin compound. The alkyl aluminum compounds, either trialky aluminum or dialkyl aluminum halide, are preferred. Particularly preferred is a dialkyl aluminum halide with an alkyl moiety containing 1 to 12 carbon atoms and iodide as the halide. The activator is readily soluble in the cycloolefin. The activator is prepared by mixing the alkyl aluminum compound or mixture of alkyl aluminum compounds with a Lewis base or chelating agent at a 1:1 to 1:5 molar ratio. While either order of addition, i.e., Lewis base to alkyl aluminum compound or alkyl aluminum compound to Lewis base, can be used, it is preferred to add the Lewis base to the alkyl aluminum with agitation. The reaction is highly exothermic, and it is desirable to control the rate of Lewis base addition to the alkyl aluminum compound so as to maintain the temperature at less than approximately 50° C. to prevent decomposition of the rate moderator complex. In the case of solid Lewis bases, the base can be added as the solid or dissolved in a suitable nonreactive solvent such as toluene. The activator can also be prepared by dissolving or suspending the Lewis base in the cycloolefin and adding the alkyl aluminum component. In all examples herein the activator had bis(2-methoxyethyl) ether, also known as diglyme, added. Other Lewis acids and chelating agents will also work.

When the two parts of the catalyst system are combined, the resulting cycloolefin (for example dicyclopentadiene) to catalyst compound ratio will be from about 500:1 to about 15,000:1 on a molar basis, preferably 2000:1 and the catalyst compound to alkyl aluminum ratio will be from about 1:2 to about 1:5.

A cycloolefin reaction mixture moderated by phosphorus containing compounds according to this invention remains fluid for a relatively long time at room temperature prior to forming a gel. By varying the amounts of additive, activator and catalyst as well as the starting temperature, it is possible to delay the gel time over a wide time period. Thus, the catalyst components need not be mixed and immediately injected into a mold. While the RIM technique can be employed, processing is not limited to the RIM technique. Moreover, the RIM technique can be used with a premixed reactive solution (i.e., cycloolefin containing both catalyst and activator) and materials can be charged directly into the heated mold without using a mix head on the molding machine.

The great advantage of using the additives of this invention results from the extended gel time that they provide at convenient molding temperatures, i.e., about 80° C. At 80° C., the gel time can be extended to as long as three minutes and more; whereas solutions containing conventional rate moderators gel within 15 to 20 seconds at most. This extended gel time, during which the reaction mixture remains highly fluid, allows the reaction mixture to be used in techniques where molds are filled slowly. For example, the mixture can be employed in rotational molding where centrifugal force is employed to distribute the mixture and where the polymerization reaction cannot be permitted to start until uniform distribution is achieved. The mixtures are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using the additives of this invention. Using the additives described in this invention, molds can be charged at the polymerization temperature in most cases.

In the known processes, where RIM processing is usually contemplated, combining of the components is most conveniently accomplished by mixing equal parts of two solutions, one of which contains twice the desired concentration of catalyst component, and the other of which contains twice the desired concentration of activator. This is possible, but not necessary, when the rate moderators contemplated herein are employed. Since the reactive mixture does not gel immediately, it is frequently convenient to add one part of the system to substantially all of the cycloolefin and, just prior to the polymerization and molding, add a concentrate of the other part.

Monomers that may be used with this invention include strained ring non-conjugated cycloolefins which are metathesis polymerizable. These include, for example, dicyclopentadiene, dicyclopentadiene oligomers, norbornene, norbornadiene, 4-alkylidene norbornenes, dimethanooctahydronaphthalene, dimethanohexahydronaphthalene, substituted derivatives of these compounds and mixtures of two or more of these monomers. The preferred cycloolefin monomer is dicyclopentadiene or a mixture of dicyclopentadiene with other strained ring hydrocarbons in ratios of 1 to 99 mole % of either monomer, preferably about 75 to 99 mole % dicyclopentadiene.

The invention is illustrated by the following examples. In these examples, the catalyst component was prepared by suspending a $WCl_6/WOCl_4$ complex in toluene, reacting it with phenol to solubilize it and complexing it with acetyl acetone. This product was then diluted to a 0.1 molar concentration by adding sufficient additional toluene. A 1.0 molar toluene solution of an 85:15 mixture of tri-n-octyl aluminum (TNOA) and dioctyl aluminum iodide (DOAI) was prepared. One equivalent of bis(2-methoxyethyl) ether (diglyme) per mole of combined TNOA and DOAI was added to form a standard, state of the art control activator for dicyclopentadiene polymerization.

CONTROL EXAMPLES

To a nitrogen-sparged vessel was charged 5 volumes of dicyclopentadiene. To this was added 0.06 volume of the standard 85:15 TNOA/DOAI mixture described above, and the mass was mixed well. After the mixing, 0.2 volume of the 0.1M tungsten catalyst component solution was injected and mixed well. The vessel was immersed in a constant temperature bath maintained at 80° C. or at other temperatures as indicated in the individual examples.

The time from addition of the tungsten catalyst component until formation of a non-fluid gel was noted and recorded as the gel time. Similarly the time from addition of the catalyst until the temperature reached 100° C. (or 160° C. in the case of runs started at 80° C.) was recorded and considered the cure time. The difference between the starting and maximum temperatures was recorded as ΔT. The thermocouple used to measure the temperatures was rotated during the polymerization (when above 100° C.) so as to break the seal with the polymer plug, then removed before it became "frozen" in place. For the control examples, these values are recorded in Table I. It typically took 3 seconds to gel and 30 seconds to reach 100° C. for the higher Purity DCPD monomer. The comparable values for the lower purity DCPD monomer in the control examples were 8 seconds and 42 seconds.

TABLE I

| Example No. | Wt. % of Additive | Initial Temp. °C. | Gel Time (sec) | Seconds to 100° C. | ΔT | Residual Monomer |
|---|---|---|---|---|---|---|
| Control 1 | *0 | 32 | 3 | 32 | 180 | 2.32 |
| Control 2 | *D 0 | 32 | 3 | 30 | 170 | 0.4 |
| Control 3 | *D 0 | 32 | 3 | 28 | 170 | 0.5 |
| Control 4 | *D 0 | 32 | 3 | 30 | 171 | 0.4 |
| Control 5 | **D 0 | 32 | 8 | 43 | 182 | 0.90 |
| Control 6 | **0 | 30 | 8 | 42 | 199 | 1.28 |
| Control 7 | **D 0 | 31 | 8 | 43 | 172 | — |
| Control 8 | **0 | 32 | — | — | — | 0.77 |

*DCPD was about 99.4% pure
**DCPD was about 98.7% pure
D = 1 volume diphenyldichloromethane added per volume tungsten on a molar basis.

EXAMPLES 1 TO 3

The procedure used to test the control solutions was followed using various quantities of various phosphorus containing compounds. In Examples 1 to 3 several aryl phosphates were used. In Example 1, various quantities of a typical phosphorus compound, triphenyl phosphate, were included in polymerization of dicyclopentadiene. The results shown in Table II demonstrate that triphenyl phosphate slowed the gel and cure times. A 20% level (Example 1A) of triphenyl phosphate prevented polymerization. At a 10% level (Example 1B), the time to gel was extended from the usual 8 seconds to 90 seconds and it took 302 seconds to reach 100° C. (cure time). The residual monomer level was 1.18%. Doubling the levels of catalyst and activator reduced the gel time from 90 to 70 seconds and the cure time from 302 to 187 seconds. Various levels of triphenyl phosphate from 0.5 to 10% were tried. The times to gel and cure generally decreased as the amount of additive decreased. At a 0.5% level, the time to gel was three or four times that without an additive and the time to 100° C. two or three times longer. Purification of the additive to a level of purity of 99.5 to 99.8% by passage through a column of alumina did not change the results in tests at 1.0% triphenyl phosphate. This indicates that the delays observed were not due to impurities in the additive. Raising the starting temperature to 80° C. (Example 1F) eliminated the delays but increased the level of residual monomer. A more powerful additive would be needed for polymerizations starting at 80° C. The levels of residual monomer were reduced by approximately one-half by the use of dichlorodiphenylmethane at a 1:1 molar ratio to the tungsten catalyst (EX. 1G, 1K, 1P). A number of further examples herein demonstrate that addition of dichlorodiphenylmethane significantly reduces the level of residual monomer following polymerization.

TABLE II

| Example No. | Wt. % of Additive | Initial Temp. °C. | Gel Time (sec) | Seconds to 100° C. (160° C. for runs started at 80° C.) | ΔT | % Residual Monomer |
|---|---|---|---|---|---|---|
| 1A | 20% Triphenyl Phosphate | 31 | No reaction | | | |
| 1B | 10% Triphenyl Phosphate | 31 | 90 | 302 | 152 | 1.18 |
| 1C | *10% Triphenyl Phosphate | 32 | 70 | 187 | 168 | 0.60 |
| 1D | 5% Triphenyl Phosphate | 31 | 80 | 231 | 181 | 0.91 |
| 1E | 2.5% Triphenyl Phosphate | 31 | 45 | 182 | 177 | 1.01 |
| 1F | D 2.5% Triphenyl Phosphate | 80 | Instant | 10 | 140 | 3.11 |
| 1G | D 2.5% Triphenyl Phosphate | 30 | 40 | 249 | 171 | 0.52 |
| 1H | 1.0% Triphenyl Phosphate | 31 | 30 | 116 | 171 | 1.57 |
| 1I | 1.0% Triphenyl Phosphate | 32 | 55 | 160 | 197 | — |
| 1J | *1.0% Triphenyl Phosphate | 32 | 30 | 102 | 155 | — |
| 1K | D 1.0% Triphenyl Phosphate | 30 | 18 | 164 | 177 | 0.78 |
| 1L | + 1.0% Triphenyl Phosphate | 31 | 42 | 143 | 169 | 2.84 |
| 1M | *+ 1.0% Triphenyl Phosphate | 30 | 18 | 87 | 169 | 1.81 |
| 1N | 0.5% Triphenyl Phosphate | 32 | 8 | 104 | 174 | — |
| 1O | 0.5% Triphenyl Phosphate | 31 | 36 | 128 | 173 | 1.11 |
| 1P | D 0.5% Triphenyl Phosphate | 32 | 25 | 100 | 170 | 0.58 |

* = Two times the usual level of catalyst and activator was used.
+ = Passage of additive through neutral alumina.
D = 1 volume diphenyldichloromethane used per volume tungsten on molar basis.

Tricresyl phosphate (Example 2A–2D) also delayed gel and cure times. Butylated triphenyl phosphate (Example 3A–3C) was also an effective additive, providing similar results in reduction of gel and cure times as triphenyl phosphate. The data for Examples 2 and 3 may be found in Table III.

achieve polymerization with a four-fold delay in gel time and a two-fold delay in cure. Cure came fairly soon after gelling, which is desirable for minimizing molding cycle time. As has been demonstrated by earlier examples, dichlorodiphenylmethane could be used to reduce the high residual monomer level to a lower level. The

TABLE III

| Example No. | Wt. % of Additive | Initial Temp. °C. | Gel Time (sec) | Seconds to 100° C. (160° C. for runs started at 80° C.) | ΔT | % Residual Monomer |
|---|---|---|---|---|---|---|
| 2A | *+ 2.5% Tricresyl Phosphate (CH$_3$C$_6$H$_4$)$_3$PO$_4$ | 30 | 90 | 256 | 148 | 1.25 |
| 2B | 1.0% Tricresyl Phosphate (CH$_3$C$_6$H$_4$)$_3$PO$_4$ | 32 | 8 | No Reaction | — | — |
| 2C | *1.0% Tricresyl Phosphate (CH$_3$C$_6$H$_4$)$_3$PO$_4$ | 32 | Instant | 100 | 124 | 2.53 |
| 2D | *+ 1.0% Tricresyl Phosphate (CH$_3$C$_6$H$_4$)$_3$PO$_4$ | 29 | 80 | 189 | 155 | 3.28 |
| 3A | 1.0% Butylated Triphenyl Phosphate | 32 | 5 | 180 | 160 | 1.11 |
| 3B | + 1.0% Butylated Triphenyl Phosphate | 30 | 55 | 182 | 169 | 1.87 |
| 3C | *+ 1.0% Butylated Triphenyl Phosphate | 30 | 38 | 115 | 178 | 1.84 |

* = Two times the usual level of catalyst and activator.
+ = Passage through neutral alumina.

EXAMPLES 4 TO 6

In Examples 4 and 5 the additive was an aliphatic phosphate. Tributyl phosphate was used in Example 4 and tris (5-norbornenyl-2-methyl) phosphate was used in Example 5. The results are shown in Table IV.

use of a metathesis polymerizable monomer, such as the phosphate used in Example 6, or the analogous phosphite of Example 21 as a delay additive, has the advantage of entering into the polymerization reaction to become a part of the polymer repeating unit. Although 1.0% tributyl phosphate (Example 4) prevented poly-

TABLE IV

Aliphatic Phosphates

| Example No. | Wt. % of Additive | Initial Temp. °C. | Gel Time (sec) | Seconds to 100° C. (160° C. for runs started at 80° C.) | ΔT | % Residual Monomer |
|---|---|---|---|---|---|---|
| 4A | *1.0% Tributyl Phosphate | 31 | N.R. | — | — | — |
| 4B | +*1.0% Tributyl Phosphate | 32 | N.R. | — | — | — |
| 4C | D* 1.0% Tributyl Phosphate | 60 | 42 | 190 | 154 | 2.2 |
| 5A | D 1.0% Triethyl Phosphate | 60 | 75 min | —a | — | 13.9 |
| 5B | D* 1.0% Triethyl Phosphate | 60 | 83 | 272 | 150 | 2.1 |
| 6A | *15% Tris(5-Norbornenyl-2-methyl)phosphate | 30 | N.R. | — | — | — |
| 6B | *10% Tris(5-Norbornenyl-2-methyl)phosphate | 30 | N.R. | — | — | — |
| 6C | D* 1.0% Tris(5-Norbornenyl-2-methyl)phosphate | 32 | N.R. | — | — | — |
| 6D | 0.5% Tris(5-Norbornenyl-2-methyl)phosphate | 59 | 35 | 78 | 136 | 5.30 |
| 6E | D 0.1% Tris(5-Norbornenyl-2-methyl)phosphate | 32 | 12 | 42 | 184 | — |

* = Two times the usual amount of activator and catalyst.
+ = Additive passed through neutral alumina column.
D = 1 volume diphenyldichloromethane used per tungsten on a molar basis.
N.R. = No reaction in five minutes.
a = Hard plug formed in more than 5 minutes when heat gun applied heat one hour later Aliphatic phosphates showed much higher delaying activity than the aryl phosphates. In Example 6, with tris(5-norbornenyl-2-methyl)phosphate, it was necessary to increase the starting temperature to 59° C. to merization at an initial temperature of 32° C., at a 60° C. starting temperature polymerization proceeded. The use of a simple phosphate of this type would be much less expensive than preparing a monomer phosphate by a custom synthesis.

EXAMPLES 7 TO 12

In Examples 7 through 12 a variety of other phosphorus(V) compounds were tested for their effect on polymerization. The results are shown in Table V.

phosphate. Even at the 10% level triphenyphosphine sulfide there was little or no delay. Tri(n-octyl)phosphine oxide prevented polymerization at 1.0%, but did allow a polymerization without delays when a 0.5% level was used with twice the usual level of catalyst and activator. It also delayed polymerization at a starting temperature of 60° C. Ethyldiphenylphosphine oxide at

TABLE V

Other Phosphorus (V) Compounds

| Example No. | Wt. % of Additive | Initial Temp. °C. | Gel Time (sec) | Seconds to 100° C. | ΔT | % Residual Monomer |
|---|---|---|---|---|---|---|
| 7A | *+ 1.0% Diethyl Phenylphosphonate $C_6H_5P(O)(OC_2H_5)_2$ | 30 | N.R. | — | — | — |
| 7B | *1.0% Diethyl Phenylphosphonate $C_6H_5P(O)(OC_2H_5)_2$ | 32 | N.R. | — | — | — |
| 7C | D* 1.0% Diethyl Phenylphosphonate | 60 | 60 | N.R. a | — | 2.4 |
| 8 | 1.0% Triphenylphosphine oxide | 32 | 8 | 37 | 162 | — |
| 9 | *1.0% Ethyldiphenylphosphine oxide | 32 | N.R. | — | — | — |
| 10A | 1.0% Tri(n-octyl)phosphine oxide | 32 | N.R. | — | — | — |
| 10B | D* 1.0% Tri(n-octyl)phosphine oxide | 60 | 100 | N.R. a | — | 13.2 |
| 10C | D* 0.5% Tri(n-octyl)phosphine oxide | 32 | 8 | 22 | 168 | 1.98 |
| 11A | D 10% Triphenylphosphine sulfide | 32 | 6 | 44 | 133 | — |
| 11B | 1.0% Triphenylphosphine sulfide | 32 | 7 | 55 | 142 | — |
| 12 | 1.0% Tri-4-tolyl Thiophosphate $(CH_3C_6H_4O)_3PS$ | 32 | 8 | 30 | 168 | — |

\* = Two times the usual amount of activator and catalyst.
+ = Additive passed through neutral alumina column.
D = 1 volume diphenyldichloromethane used per volume tungsten on a molar basis.
N.R. = No reaction in five minutes.
a = Hard plug with heat gun.

Polymerization did not occur within 5 minutes with 1.0% diethyl phenylphosphonate. However, it did proceed when heat gun was used to produce a hard plug. In some applications it would be advantageous to have such an additive that allows polymerization to proceed only after application of heat.

Triphenylphosphine oxide at the 1.0% level gave a normal polymerization with no delay but did cause some delay at the 10% level. Normal polymerization without delay also occurred in the presence of 1.0% triphenylphosphine sulfide and 1.0% tri-4-tolyl thiophosphate. Although phosphates generally appear to prevent polymerization at room temperature, higher starting temperatures allow polymerization to occur.

EXAMPLES 13 TO 41

In Examples 13 through 41 the effectiveness of a variety of phosphorus (III) compounds in affecting the gel and cure times of DCPD was determined. The results may be seen in Table VI.

TABLE VI

Phosphorus (III) Compounds - Phosphites

| Example No. | Wt. % of Additive | Initial Temp. °C. | Gel Time (sec) | Seconds to 100° C. | ΔT | % Residual Monomer |
|---|---|---|---|---|---|---|
| 13A | D 2.0% Trimethyl Phosphite | 74 | 100 | —$^a$ | — | 3.34 |
| 13B | *D 2.0% Trimethyl Phosphite | 80 | 8 | 88 | 161 | 2.72 |
| 13C | D 0.5% Trimethyl Phosphite | 32 | N.R. | — | — | — |
| 13D | *D 0.5% Trimethyl Phosphite | 32 | 90 | N.R. | — | — |
| 13E | 0.5% Trimethyl Phosphite | 60 | 4 | 12 | 145 | 1.57 |
| 13F | D 0.1% Trimethyl Phosphite | 31 | 18 | 204 | 195 | 0.71 |
| 13G | *D 0.1% Trimethyl Phosphite | 32 | 12 | 55 | 180 | — |
| 14A | D 0.5% Triethyl Phosphite | 32 | 150 | N.R.$^a$ | — | — |
| 14B | *D 0.5% Triethyl Phosphite | 32 | 70 | N.R.$^a$ | — | — |
| 14C | +D 0.1% Triethyl Phosphite | 32 | 12 | 47 | 187 | 0.82 |
| 15A | *D 0.5% Tris(2-Chloroethyl) Phosphite | 32 | 30 | 81 | 193 | 0.38 |
| 15B | D 0.25% Tris(2-Chloroethyl) Phosphite | 32 | 28 | 172 | 201 | 0.70 |
| 15C | *D 0.25% Tris(2-Chloroethyl) Phosphite | 32 | 18 | 56 | 180 | — |
| 16 | *D 0.5% Triallyl Phosphite | 32 | N.R. | — | — | — |
| 17A | *+ 1.0% Triisopropyl Phosphite | 31 | 130 | 252 | 172 | 1.20 |
| 17B | 1.0% Triisopropyl Phosphite | 31 | 120 | 423 | 171 | 8.0 |
| 17C | +D 0.5% Triisopropyl Phosphite | 32 | 40 | 237 | 169 | 0.68 |
| 17D | D 0.5% Triisopropyl Phosphite | 60 | 6–8 | 84 | 161 | 1.24 |
| 17E | + 0.5% Triisopropyl Phosphite | 30 | 180 | 366 | 167 | 1.71 |
| 17F | D 0.25% Triisopropyl Phosphite | 32 | 23 | 130 | 176 | 0.54 |
| 17G | D 0.1% Triisopropyl Phosphite | 32 | 18 | 106 | 177 | 0.51 |
| 18 | D 0.5% Triisobutyl Phosphite | 31 | 60 | 323 | 190 | 0.55 |
| 19A | 2.5% Triisooctyl Phosphite | 60 | N.R. | — | — | — |
| 19B | * 2.5% Triisooctyl Phosphite | 60 | N.R. | — | — | — |
| 19C | 1.0% Triisooctyl Phosphite | 60 | N.R. | —$^a$ | — | — |
| 19D | * 1.0% Triisooctyl Phosphite | 60 | 100 | N.R. | — | — |
| 19E | D 0.5% Triisooctyl Phosphite | 32 | 33 | 190 | 146 | 0.79 |
| 19F | D* 0.5% Triisooctyl Phosphite | 32 | 12 | 47 | 185 | — |
| 20A | D* 0.5% Trineodecyl Phosphite | 31 | 18 | 56 | 171 | 0.63 |
| 20B | D 0.1% Trineodecyl Phosphite | 32 | 15 | 78 | 187 | — |
| 21A | *D 2.5% Tris(5-norbornenyl-2-methyl) phosphite | 72 | N.R. | —$^a$ | — | — |
| 21B | *D 2.5% Tris(5-norbornenyl-2-methyl) phosphite | 72 | 40 | N.R. | — | — |

TABLE VI-continued

Phosphorus (III) Compounds - Phosphites

| Example No. | Wt. % of Additive | Initial Temp. °C. | Gel Time (sec) | Seconds to 100° C. | ΔT | % Residual Monomer |
|---|---|---|---|---|---|---|
| 21C | D 0.5% Tris(5-nornornenyl-2-methyl) phosphite | 32 | over 180 | N.R.$^a$ | — | 0.84 |
| 21D | *D 0.5% Tris(5-nornornenyl-2-methyl) phosphite | — | — | — | — | — |
| 22A | D 0.5% Diethyl Chlorophosphite $(C_2H_5O)_2PCl$ | 32 | 60 | 100 | 169 | 0.29 |
| 22B | *D 0.5% Diethyl Chlorophosphite $(C_2H_5O)_2PCl$ | 32 | 20 | 145 | 177 | 0.45 |
| 23A | D 0.5% Ethyldichlorophosphite $C_2H_5OPCl_2$ | 32 | 14 | 44 | 189 | — |
| 23B | *D 0.5% Ethyldichlorophosphite $C_2H_5OPCl_2$ | 32 | 12 | 85 | 184 | — |
| 24A | D 0.5% Benzyldiethyl Phosphite | 32 | 8 | 41 | 190 | — |
| 24B | *D 0.5% Benzyldiethyl Phosphite | 32 | 150 | N.R.$^a$ | — | 1.00 |
| 25 | 0.5% Diisodecylphenylphosphite $(i\text{-}C_{10}H_{21}O)_2POC_6H_5$ | 32 | 45 | 168 | 187 | 0.32 |
| 26 | D 0.5% Isooctyldiphenyl Phosphite | 32 | 12 | 68 | 179 | — |
| 27A | *D 0.5% Diethylphenylphosphonite $(C_2H_5O)_2PC_6H_5$ | 32 | 10 | 44 | 182 | — |
| 27B | 0.5% Diethylphenylphosphonite $(C_2H_5O)_2PC_6H_5$ | 60 | N.R. | —$^a$ | — | 0.73 |
| 27C | * 0.5% Diethylphenylphosphonite $(C_2H_5O)_2PC_6H_5$ | 60 | 60 | 168 | 155 | 1.51 |
| 27D | D 0.1% Diethylphenylphosphonite $(C_2H_5O)_2PC_6H_5$ | ? | 10 | 25 | 123 | 0.99 |
| 27E | *D 0.1% Diethylphenylphosphonite $(C_2H_5O)_2PC_6H_5$ | 31 | 40 | 178 | 177 | 0.74 |
| 28A | D 0.5% Diisopropyl Phenylphosphonite $(iC_3H_7O)_2PC_6H_5$ | 32 | 20 | 47 | 189 | — |
| 28B | *D 0.5% Diisopropyl Phenylphosphonite $(iC_3H_7O)_2PC_6H_5$ | 32 | 120 | N.R.$^a$ | — | 0.67 |
| 28C | D 0.1% Diisopropyl Phenylphosphonite $(iC_3H_7O)_2PC_6H_5$ | 32 | 28 | 139 | 177 | 0.58 |
| 29 | *D 0.5% Ethyldiphenylphosphinite $C_2H_5OP(C_6H_5)_3$ | 32 | 18 | 92 | 180 | 2.62 |
| 30A | D 10.0% Triphenyl Phosphite | 32 | 35 | 217 | 188 | 1.33 |
| 30B | *D 10.0% Triphenyl Phosphite | 32 | 10 | N.R.$^a$ | — | 0.2 |
| 30C | 1.0% Triphenyl phosphite | 32 | 12 | 98 | 162 | 0.05 |
| 31 | *D 0.5% Tetraethyl pyrophosphite $(C_2H_5O)_2POP(OC_2H_5)_2$ | 32 | 8 | 30 | 175 | — |
| 32A | D 0.5% 1,2-phenylenephosphorochloridite | 31 | 45 | 177 | 179 | 1.50 |
| | | 32 | 12 | 125 | 179 | — |

[Structure: benzene ring fused with O-PCl-O five-membered ring]

| 32B | *D 0.5% 1,2-phenylenephosphorochloridite | 32 | 8 | 52 | 184 | — |

[Structure: benzene ring fused with O-PCl-O five-membered ring]

| 33A | D 10.0% Ethylene Chlorophosphite | 33 | 7 | N.R.$^a$ | — | 9.9 |

[Structure: O-PCl-O five-membered ring with ethylene]

| 33B | *D 10.0% Ethylene Chlorophosphite | 32 | 9 | 64 | 155 | 10.3 |

[Structure: O-PCl-O five-membered ring with ethylene]

| 33C | D 2.5% Ethylene Chlorophosphite | 32 | 5 | 29 | 172 | 0.4 |

[Structure: O-PCl-O five-membered ring with ethylene]

| 33D | D 0.5% Ethylene Chlorophosphite | 31 | 8 | 42 | 180 | — |

[Structure: O-PCl-O five-membered ring with ethylene]

| 34A | *D 0.5% Diethyl Ethylene pyrophosphite | 32 | 48 | 175 | 173 | 1.51 |

[Structure: cyclic with O—P—OC$_2$H$_5$ / O / O—P—OC$_2$H$_5$]

TABLE VI-continued

Phosphorus (III) Compounds - Phosphites

| Example No. | Wt. % of Additive | Initial Temp. °C. | Gel Time (sec) | Seconds to 100° C. | ΔT | % Residual Monomer |
|---|---|---|---|---|---|---|
| 34B | D 0.5% Diethyl Ethylene pyrophosphite | 32 | 20 | 55 | 173 | 0.96 |
| | (structure: cyclic O—P—OC$_2$H$_5$ / O / O—P—OC$_2$H$_5$) | | | | | |
| 35A | *D 0.5% Diisodecylpentaerythritoldiphosphite | 31 | 35 | 169 | 185 | 0.64 |
| | (structure: i-C$_{10}$H$_{21}$OP(OCH$_2$)(OCH$_2$)C(CH$_2$O)(CH$_2$O)POiC$_{10}$H$_{21}$) | | | | | |
| 35B | D 0.1% Diisodecylpentaerythritoldiphosphite | 32 | 23 | 89 | 178 | 0.54 |
| | (structure: i-C$_{10}$H$_{21}$OP(OCH$_2$)(OCH$_2$)C(CH$_2$O)(CH$_2$O)POiC$_{10}$H$_{21}$) | | | | | |
| 35C | *D 0.1% Diisodecylpentaerythritoldiphosphite | | | | | |
| | (structure: i-C$_{10}$H$_{21}$OP(OCH$_2$)(OCH$_2$)C(CH$_2$O)(CH$_2$O)POiC$_{10}$H$_{21}$) | | | | | |
| 36A | D 0.5% Tridodecyltrithiophosphite (C$_{12}$H$_{25}$S)$_3$P | 32 | 10 | 54 | 169 | — |
| 36B | 10% (C$_{12}$H$_{25}$S)$_3$P | 32 | 60 | N.R.[b] | — | — |
| 36C | * 10% (C$_{12}$H$_{25}$S)$_3$P | 32 | 47 | N.R. | — | — |
| 37 | *D 0.5% Tributylphosphine | 32 | N.R. | —[b] | — | — |
| 38A | D 2.5% Triphenylphosphine | 32 | 55 | 135 | 170 | 0.2 |
| 38B | *D 2.5% Triphenylphosphine | 32 | 37 | 102 | 167 | 0.1 |
| 38C | D 0.5% Triphenylphosphine | 32 | 12 | 111 | 200 | — |
| 38D | *D 0.5% Triphenylphosphine | 32 | 10 | 65 | 171 | 0.33 |

* = Two times the usual amount of activator and catalyst.
+ = Additive passed through neutral alumina column.
D = 1 volume diphenyldichloromethane used per volume tungsten on a molar basis.
a = Hard plug formed in more than 5 minutes when heat gun applied heat one hour later.
b = Soft plug formed in more than 5 minutes when heat gun used one hour later.
N.R. = No reaction in five minutes.

Triphenyl phosphite at a 10% level gave delays, but at the 1% level, which is a level normally used in the stabilization of polymers, it did not. Trialkyl phosphites are effective additives to delay gel and cure. By varying the levels of additive, catalyst and activator, as well as the starting temperature it appears possible to obtain almost any desired delay. This permits initial mixing of all ingredients together to provide a single component which can be polymerized later by adding heat. An example which illustrates this is trimethyl phosphite (Examples 13A–13G). At a 0.1% level, gel is delayed by 2.5 times and cure by five times. When 0.1% trimethyl phosphite was added with twice as much catalyst and activator, these factors became 1.5 and 1.3 respectively. At the 2.0% level it was necessary to start at an elevated temperature, 74° C., to obtain a polymerization which was not complete in 5 minutes, but which did go to completion when a heat gun was used a few hours later. Doubling the catalyst and activator with a starting temperature of 80° C. gave a polymerization with a delayed cure. Similar effects were noted in experiments at a level of 0.5% of added trimethyl phosphite.

Other trialkyl phosphites gave about the same delays on a molar basis, although note that testing was done on a weight percent basis. These include ethyl, 2-chloroethyl, isopropyl, isobutyl, isooctyl, neodecyl, benzyldiethyl and tris(5-norbornenyl-2-methyl) phosphite. It appears that from a standpoint of least cost and least adulteration, trimethyl phosphite would be the best choice among the phosphites tested. Tris(5-norbornenyl-2-methyl) phosphite would be the best choice from the standpoint of being a monomer which would become part of the polymer structure. These test results demonstrate that contrary to most previous research, a long polymerization time does not necessarily lead to an increased level of residual monomer. One hard plug, that formed after more than five minutes with the norbornene phosphite additive, contained 0.84% residual monomer. At a higher level of 2.5% phosphite with a higher starting temperature of 72° C., the residual monomer level increased to 1.89%. A higher level of dichlorodiphenylmethane could reduce the residual monomer level here.

The substitution of an electron-withdrawing group for one or more of the alkoxy groups in a trialkyl phosphate reduces the length of delays, presumably by decreasing the electron density on the phosphorus atom to produce a poorer ligand. Thus, for example, ethyl dichlorophosphite (Example 24) was less active than diethyl chlorophosphite (Example 23), which was less active than triethyl phosphite (Example 14). Isooctyldiphenyl phosphite (Example 26) was less active than triisooctyl phosphite (Example 19). Triphenyl phosphite (Example 30) gave no delay at a 1% level but did at 10%.

Diethyl phenylphosphonite (Example 27) had activity comparable to that of trialkyl phosphites, such as triethyl phosphite. This would make it a good candidate for use with a one component system, which would allow thorough mixing of viscous solutions and thorough penetration of fibrous reinforcing materials, before thermal initiation. The corresponding diisopropyl phenylphosphonite (Example 28) was less active than would be expected on a molar basis. The two isopropyl groups may offer some steric hindrance to complex formation. Ethyl diphenylphosphonite (Example 29) had about the same activity as diisopropyl phenylphosphonite. Tetraethyl pyrophosphite (Example 31) is a potential bridging ligand for two metal atoms. Its activity was less than expected based on that of triethyl phosphite. It may also have functioned as a monodentate ligand.

Four cyclic phosphites were tested. The activity of 1,2-phenylenephosphorochloridite (Example 32) was low. Ethylene chlorophosphite (Example 33) gave no delays at the 0.5% level, but it did at 10%. Diethyl ethylene pyrophosphite (Example 34) may also act as a bridging ligand. It was active at 0.5%, but was less so than triethyl Phosphite. Thus, there is no advantage to putting two phosphorus atoms in a pyrophosphite for the purposes of this invention.

Diisodecylpentaerythritol diphosphite (Example 35) is employed as a peroxide decomposer in polyolefins. It could perform this function in poly(DCPD) at the same time that it delayed gel and cure. Its activity is similar to that of triisobutyl phosphite (Example 18) on a molar basis which indicates that the larger separation of the two phosphorus atoms, compared to pyrophosphites, allows them to function independently. This may function as an effective additive to highly pure dicyclopentadiene monomer which will polymerize even faster than the control examples shown herein.

No delay was found with 0.5% tridodecyl trithiophosphite (Example 36), although at 10% it prevented polymerization in five minutes at 32° C. Tributyl phosphine (Example 37) gave a longer delay than triphenyl phosphine (Example 38). These results parallel the greater activity of trialkyl phosphates and phosphites compared with their aryl counterparts. Triphenyl phosphine at the 0.5% level showed a significant delay in cure, but less than a statistically significant delay in gel. A higher level of triphenyl phosphine additive did result in a noticeable delay in gel.

Various phosphorus containing compounds can be added to the catalyst and activator to delay the gel and cure in the metathesis polymerization of dicyclopentadiene. By varying the amounts of additive, activator and catalyst, as well as the starting temperature, any desired amount of delay could be achieved. The most desirable systems are those which provide slow gel with rapid cure while maintaining a low level of residual monomer. Such additives include the two norbornene monomer additives, tris(5-norbornenyl-2-methyl)phosphite and tris(5-norbornenyl-2-methyl)phosphate, and tris(2-chloroethyl)phosphite. With these additives, it is now possible to have a one component system with thermal initiation of polymerization. An advantage that these systems have over some other systems previously studied is the compatibility of the dichlorodiphenylmethane which can be used to lower the level of residual monomer.

What is claimed is:

1. In a process for preparing thermoset polymeric molded articles wherein a liquid reaction stream comprising a metathesis polymerizable strained ring non-conjugated cycloolefin, a metathesis polymerization catalyst, an activator selected from the group consisting of alkylaluminum, alkylzinc and alkyltin compounds, and a reaction rate moderator wherein said moderator delays onset of polymerization, are charged to a mold in which polymerization will take place, the improvement wherein said reaction rate moderator comprises:

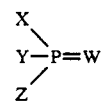

wherein X, Y and Z represent alkyl, cycloalkyl, alicyclic, aryl, aralkyl, alkaryl, alkoxy, alkylthio, aryloxy, arylthio, halogen or thiophene groups and W represents oxygen, sulfur or nothing.

2. The process of claim 1 wherein said cycloolefin is a monomer selected from the group consisting of dicyclopentadiene, norbornene, nrobornadiene, dimethanooctahydronaphthalene, dimethanohexahydronaphthalene and substituted derivatives of said monomers, or a mixture of two or more of said monomers.

3. The process of claim 2 wherein said cycloolefin is dicyclopentaadiene.

4. The process of claim 1 wherein X and Y combine to form a ring, said ring being alicyclic, benzo or benzoalicyclic.

5. The process of claim 1 wherein X and Y form two rings.

6. In a process for preparing molded articles wherein a liquid reaction stream comprising a metathesis polymerizable strained ring non-conjugated cycloolefin, a metathesis polymerization catalyst, an activator selected from the group consisting of alkylaluminum, alkylzinc and alkyltin compounds and a reaction rate moderator are charged to a mold in which polymerization will take place, the improvement wherein said reaction rate moderator, which delays onset of polymerization, is selected from the group consisting of aryl phosphates, aliphatic phosphates, aliphatic phosphates, aryl phosphites, aryl phosphines, phosphonates, phosphinates, phosphine oxides, and alkyl phosphines.

7. The process of claim 6 wherein said cycloolefin is a monomer selected from the group consisting of dicylopentadiene, norbornene, norbornadiene, dimethanooctahydronaphthealene, dimethanohexahydronaphthalene and substituted derivatives of said monomers, or a mixture of two or more of said monomers.

8. The process of claim 7 wherein said cycloolefin is dicyclopentadiene.

9. The process of claim 8 wherein said aryl phosphate is selected from the group consisting of triphenyl phosphate, tricresyl phosphates, butylated triphenyl phosphate, and tris(5-norbornenyl-2-methyl) phosphate, triethyl phosphate and tributyl phosphate.

10. The process of claim 9 wherein said aliphatic phosphite is selected from the group consisting of a trimethyl phosphite, triethyl phosphite, tris(2-chloroethyl) phosphite, benzyldiethyl phosphite, triisopropyl phosphite, triisobutyl phosphite, triallyl phosphite, tris(5-norbornenyl-2-methyl)-phosphite; triisooctyl phosphite, trineodecyl phosphite, tridocecyltrithiophosphite, diisodecylpentaerythritol diphosphite, ethylene chlorophosphite, diethyl ethylene pyrophosphite, tetraethyl pyrophosphite, ethyldichlorophosphite, and diethylchlorophosphite.

11. The process of claim 10 wherein said aryl phosphites are selected from the group consisting of diisodecylphenyl phosphite, isooctyldiphenyl phosphite, diethylphenyl phosphonite, diisopropyl phenylphosphonite, ethyldiphenylphosphonite, and triphenyl phosphite,.

12. The process of claim 11 wherein said aryl phosphine comprises triphenyl phosphine.

13. The process of claim 12 wherein said reaction rate moderator is selected from the group consisting of tris(5-norbornenyl-2-methyl)phosphite, tris(5-norbornenyl-2-methyl)phosphate, trimethyl phosphite, trialkyl phosphites, tributyl phosphate, trialkyl phosphates, trineodecyl phosphite, diethyphenylphosponite, diisodecylpentaerythritol diphosphite.

14. The process of claim 13 wherein said reaction rate moderator is selected from the group consisting of tris(5-norbornenyl-2-methyl)phosphite, tris(5-norbornenyl-2-methyl)-phosphate, and tris (2-chloroethyl)phosphate.

15. The process of claim 14 wherein dichlorodiphenylmethane is added to said metathesis polymerization catalyst.

* * * * *

UNITED STATES PATENT AND TRADEMARK OFFICE
CERTIFICATE OF CORRECTION

PATENT NO. : 4,933,402

DATED : June 12, 1990

INVENTOR(S) : Albert S. Matlack

It is certified that error appears in the above-identified patent and that said Letters Patent is hereby corrected as shown below:

In column 16, line 66, claim 10, "9" should be replaced with --8--.

In column 17, line 9, claim 11, "10" should be replaced with --8--.

In column 17, line 15, claim 12, "11" should be replaced with --8--.

In column 18, line 1, claim 13, "12" should be replaced with --8--.

In column 18, line 8, claim 14, "13" should be replaced with --8--.

In column 16, line 55, claim 7, "dicylopentadiene" should be replaced with --dicyclopentadiene--.

Signed and Sealed this

Twenty-eighth Day of January, 1992

*Attest:*

HARRY F. MANBECK, JR.

*Attesting Officer*     *Commissioner of Patents and Trademarks*